United States Patent
Yeung et al.

(10) Patent No.: US 7,577,111 B2
(45) Date of Patent: Aug. 18, 2009

(54) METHOD AND SYSTEM FOR WIRELESS INTERFACING OF ELECTRONIC DEVICES

(75) Inventors: Michael Yeung, Mission Viego, CA (US); Brad Emerson, Costa Mesa, CA (US); Peter Tran, Garden Grove, CA (US); Louis Ormond, Irvine, CA (US)

(73) Assignee: Toshiba Tec Kabushiki Kaisha (JP)

( * ) Notice: Subject to any disclaimer, the term of this patent is extended or adjusted under 35 U.S.C. 154(b) by 882 days.

(21) Appl. No.: 10/054,513

(22) Filed: Nov. 13, 2001
(Under 37 CFR 1.47)

(65) Prior Publication Data

US 2003/0017805 A1    Jan. 23, 2003

Related U.S. Application Data

(60) Provisional application No. 60/247,132, filed on Nov. 10, 2000.

(51) Int. Cl.
*H04B 7/00* (2006.01)
(52) U.S. Cl. .................. 370/310; 370/278; 370/319; 370/344; 370/480; 709/202; 709/203; 709/219; 709/220
(58) Field of Classification Search .................. 370/310, 370/276, 277, 278, 319, 344, 480; 709/202, 709/203, 219, 220
See application file for complete search history.

(56) References Cited

U.S. PATENT DOCUMENTS

| | | | |
|---|---|---|---|
| 5,845,280 A * | 12/1998 | Treadwell et al. ............... 707/8 |
| 6,028,984 A * | 2/2000 | Kimball ....................... 709/249 |
| 6,256,666 B1 * | 7/2001 | Singhal ....................... 709/217 |
| 6,397,259 B1 * | 5/2002 | Lincke et al. ................ 709/236 |
| 6,421,716 B1 * | 7/2002 | Eldridge et al. ............. 709/219 |
| 6,609,844 B1 * | 8/2003 | Petteruti et al. ............... 400/88 |
| 6,922,725 B2 * | 7/2005 | Lamming et al. ........... 709/227 |
| 6,931,463 B2 * | 8/2005 | Striemer ...................... 710/62 |
| 6,934,752 B1 * | 8/2005 | Gubbi .......................... 709/225 |
| 6,952,780 B2 * | 10/2005 | Olsen et al. ................. 380/243 |
| 6,982,800 B1 * | 1/2006 | Cavill et al. ................ 358/1.15 |
| 7,028,102 B1 * | 4/2006 | Larsson et al. .............. 709/246 |
| 2002/0138557 A1 * | 9/2002 | Mukaiyama et al. ........ 709/203 |

* cited by examiner

*Primary Examiner*—Ricky Ngo
*Assistant Examiner*—Luat Phung
(74) *Attorney, Agent, or Firm*—Tucker Ellis & West LLP

(57) ABSTRACT

The present invention enables users to interface with a wide range of computing and telecommunication devices seamlessly without a cable connecting the devices. As such, the present invention allows for the replacement of the many proprietary cables that connect one device to another with one universal short-range radio link. The typical BLUETOOTH® system consist of four basic components: a radio (RF section) that receives and transmits data and voice; a baseband or link control unit that processes the transmitted or received data; link management software that manages the transmission; and supporting application software. Electronic devices incorporating BLUETOOTH® technology will replace RS-232, parallel, Universal Serial Bus (USB), and other types of cables with a single, standard wireless connection. BLUETOOTH® radio technology will also provide a universal bridge to existing data networks, a peripheral interface, and a mechanism to form small private ad hoc groupings of connected devices away from fixed network infrastructures.

14 Claims, 18 Drawing Sheets

The automatic synchronizer

The ultimate headset        or to a PSTN adapter

Toshiba Bluetooth Printing System – Block Diagram

METHOD AND SYSTEM FOR WIRELESS INTERFACING OF ELECTRONIC DEVICES

CROSS-REFERENCE TO RELATION APPLICATIONS

The present application claims the benefit of U.S. Provisional Application No. 60/247,132, filed Nov. 10, 2000.

FIELD OF INVENTION

The present invention is directed to a method and system for wireless interfacing of electronic devices. More particularly, the present invention implements "BLUETOOTH® wireless technology which permits electronic devices to communicate with other without wired connections. BLUETOOTH® is a specification for a small-form factor, low-cost radio solution providing links between mobile computers, mobile phones and other portable hand-held devices, printers, printers, facsimile machines, copiers and connectivity to the Internet.

BACKGROUND OF THE INVENTION

Electronic devices have traditionally interfaced to other electronic devices through the use of specially designed cables. There are many drawbacks associated with the use of specially designed cables. These drawbacks include: limited mobility of the electronic device, the requirement of specially designed cable connectors that are not universal, the requirement of multiple connectors for each electronic device desired to be interfaced, and workspace obstructions associated with cables connecting to the electronic devices.

The present invention enables users to interface with a wide range of computing and telecommunication devices seamlessly without a cable connecting the devices. As such, the present invention allows for the replacement of the many proprietary cables that connect one device to another with one universal short-range radio link. For instance, BLUETOOTH® devices will replace RS-232, parallel, Universal Serial Bus (USB), and other types of cables with a single, standard wireless connection. Therefore, any BLUETOOTH®-enabled device will be able to communicate with any other BLUETOOTH®-enabled device. For example, a BLUETOOTH®-certified personal digital assistant (PDA) or cellular phone will work with any personal computer equipped with a BLUETOOTH®-enabled card. Printers, PDA's, cellular telephones, desktop computers, fax machines, keyboards, joysticks and virtually any other digital device can be part of the BLUETOOTH® system.

BLUETOOTH® technology does more than just untethering devices by replacing the cables, BLUETOOTH® radio technology provides a universal bridge to existing data networks, a peripheral interface, and a mechanism to form small private ad hoc groupings of connected devices away from fixed network infrastructures.

SUMMARY OF THE INVENTION

In accordance with the present invention, a wireless transmission method and apparatus is disclosed for implementing the steps of transmitting a request packet requesting a response from a second electronic device to a first electronic device and transmitting a response packet from the first electronic device to the second electronic device in response to the request packet. One or more data file packets are transmitted from the second electronic device to the first electronic device. Correct transmission is verified of the at least one data file packet. Transmission of at least a portion of data file packets is verified from an entire input data file, and transmission is terminated upon completion of a predetermined condition.

As will be realized, the invention is capable of other and different embodiments and its several details are capable of modifications in various respects, all without departing from the invention. Accordingly, the drawing and description are to be regarded as illustrative and not restrictive.

BRIEF DESCRIPTION OF THE DRAWINGS

The subject application is described with reference to certain figures, including.

DETAILED DESCRIPTION OF THE INVENTION

Figure 1:
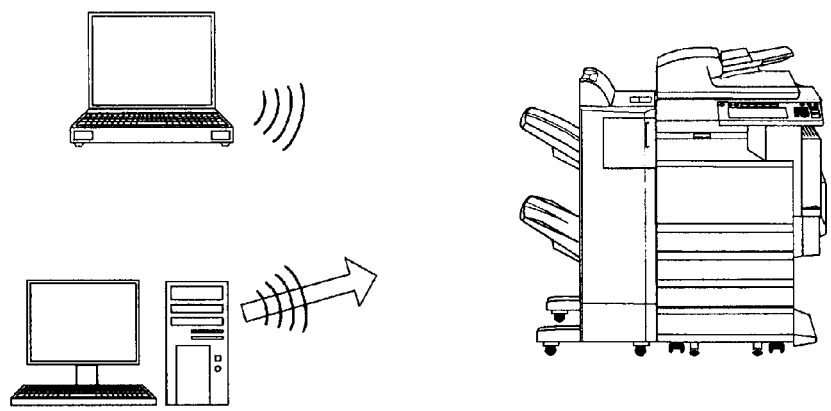
FIG. 1 is a diagram of a cable replacement implementation of the system for wireless connection to a document processor according to one embodiment of the subject application.

The present invention is designed to operate in a noisy radio frequency environment, the BLUETOOTH® enabled radio uses a fast acknowledgment and frequency hopping scheme to make the link robust. Thus, BLUETOOTH® radio modules avoid interference from other signals by hopping to a new frequency after transmitting or receiving a packet. Compared with other systems operating in the same frequency band (ISM band), the BLUETOOTH® radio typically hops faster and uses shorter packets. Accordingly, the BLUETOOTH® radio is more robust than other systems currently available. The shorter packets and faster hopping also limit the impact of domestic and professional microwave ovens. In addition, the use of forward error correction limits the impact of random noise on long-distance links.

The BLUETOOTH® specification is a de facto standard containing the information required to ensure that diverse devices supporting the BLUETOOTH® wireless technology can communicate with each other worldwide. The BLUETOOTH® specification Ver. 1.0. may be located at www.BLUETOOTH®.com and is incorporated by reference as if fully rewritten herein. Volume One of the BLUETOOTH® specification (known as the "Core") specifies components such as the radio, baseband, link manager, service discovery protocol, transport layer, and interoperability with different communication protocols. Volume Two of the BLUETOOTH® specification (known as the "Profiles") specifies the protocols and procedures required for different types of BLUETOOTH® applications.

All of BLUETOOTH® system applications consist of four basic parts: a radio (RF section) that receives and transmits data and voice; a baseband or link control unit that processes the transmitted or received data; link management software that manages the transmission; and supporting application software.

The BLUETOOTH® radio is a short-distance, low-power radio that operates in the unlicensed ISM band at approximately 2.4 GHz, using a nominal antenna power of 0 dBm. At 0 dBm, the electronic devices must be within 10 meters (approximately 33 feet) to communicate with each other using the BLUETOOTH® standard. Other ranges are available by increasing the antenna power. For instance, a range of 100 meters may be achieved by using an antenna power of 20 dBm. Data is transmitted at a maximum rate of up to 1 Mbps.

Since the 2.4-GHz frequency is shared by other types of equipment, the BLUETOOTH® specification employs frequency-hopping spread-spectrum techniques to eliminate interference.

The baseband converts received radio signals into a digital format and converts digital or voice data into a format that can be transmitted using a radio signal. The BLUETOOTH® Specification requires that each packet contain information about where it is coming from, what frequency it is using, and where it is going. Packets also contain information on how the data was compressed, the order in which the packets were transmitted, and information used to verify the effectiveness of the transmission. When the data is received it is checked for accuracy, extracted from the packet, reassembled, decompressed, and possibly filtered.

The BLUETOOTH® link is the method of data transmission to be used. The BLUETOOTH® standard supports two link types—synchronous connection-oriented (SCO) links, used primarily for voice communications, and asynchronous connectionless (ACL) links for packet data. Each link type supports sixteen different packet types that are used, depending on the application. Any two devices in a BLUETOOTH® system may use either link type and may change link types during a transmission.

Link manager software runs on a microprocessor and manages the communication between BLUETOOTH® devices. Each BLUETOOTH® device has its own link manager, which discovers other remote link managers, and communicates with them to handle link setup, negotiate features, authenticate QoS, and to encrypt and adjust data rate on link, dynamically.

The link controller is a supervisory function that handles all of the BLUETOOTH® baseband functions and supports the link manager. It sends and receives data, identifies the sending device, performs authentication and ciphering functions, determines what type of frame to use on a slot-by-slot basis, directs how devices will listen for transmissions from other devices, or puts devices into various power-save modes according to BLUETOOTH®-specified procedures. Each packet uses a single 625-μs timeslot, but can be extended to cover up to five slots. BLUETOOTH® supports an asynchronous data channel, three synchronous voice channels at 64 kbps, or simultaneous asynchronous data and synchronous voice channels. The asynchronous channel can support an asymmetric link of 721 kbps in either direction and 57.6 kbps in the return direction, or a 432.6-kbps symmetric link.

The application software is embedded in the device that operates an application over the BLUETOOTH® protocol stack. This software allows the PDA, mobile phone, or keyboard to function properly in relation to the other BLUETOOTH® devices.

The present invention will now be described with reference to the attached figures. It should be understood that the server side of the present implementation would preferably be deployed on GL1010 type servers, but could also be employed on SC-3 or any other type servers, without departing from the invention.

As shown in FIG. 1, in the Cable Replacement Mode, a BLUETOOTH®-enabled computer uses server drivers and prints as if the electronic device was physically connected to the printer.

Figure 2:
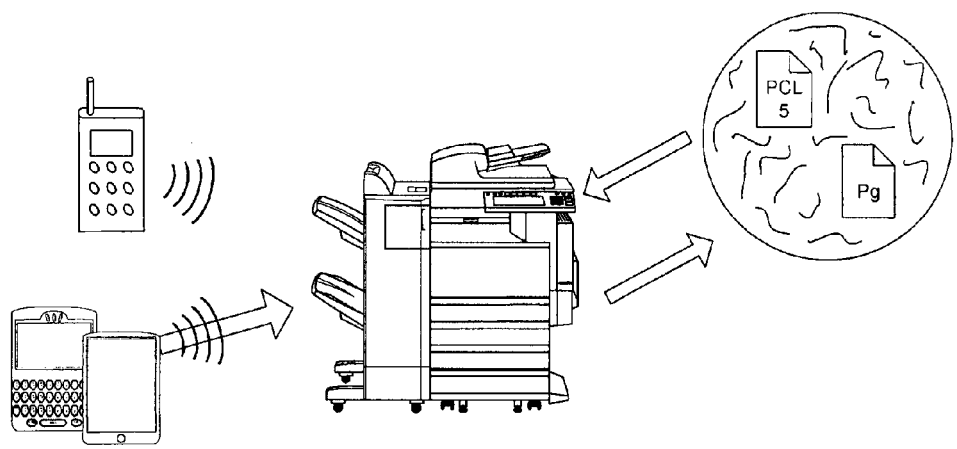
FIG. 2 is a diagram illustrating a print by reference implementation of the system for wireless connection to a document processor according to one embodiment of the subject application.

In addition, as shown in FIG. 2, documents may be printed by reference. Typically the documents are prepared and stored to the Web in PDL format (postscript/PCL5), PDF, Word, Excel, or PowerPoint. The SERVER is given the name of the file to print via a BLUETOOTH® connected device. The file is retrieved via the Internet or the Intranet and then is ripped and printed. This is ideal for handheld devices, the sole drawback is that SERVER print driver are required to prepare the files.

Figure 3:
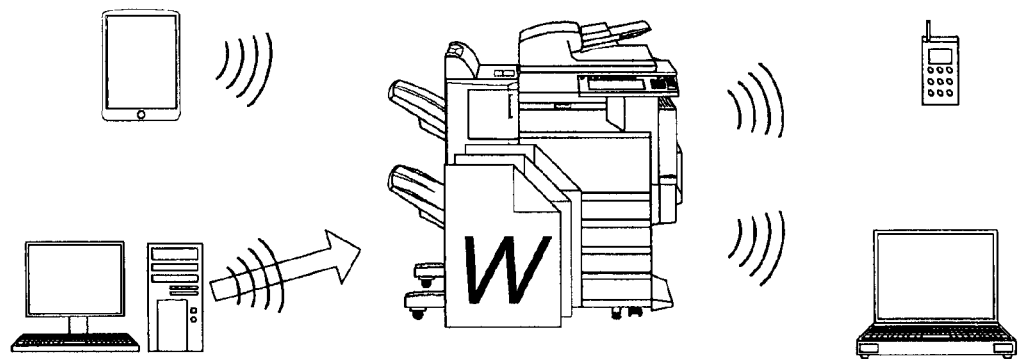
FIG. 3 is a diagram illustrating a remote print implementation of the system for wireless connection to a document processor according to one embodiment of the subject application.

FIG. 3 illustrates the remote printing service associated with the present invention. Documents are prepared and stored to the Web in application format—such as Microsoft Word format with the ".doc" extension files. The SERVER driver is given the name of the file to print via a BLUETOOTH® connected device. The file is retrieved via the Internet or the Intranet and printed via an application—such as Microsoft Word®. The benefit of this method or system is that the print drivers are on the SERVER. One drawback associated with this embodiment is that the document may contain fonts not stored on the SERVER.

The following is listing of the applications contemplated by the present invention. Note, the following is by way of example and is not intended to limit the scope of the invention.

Figure 4:
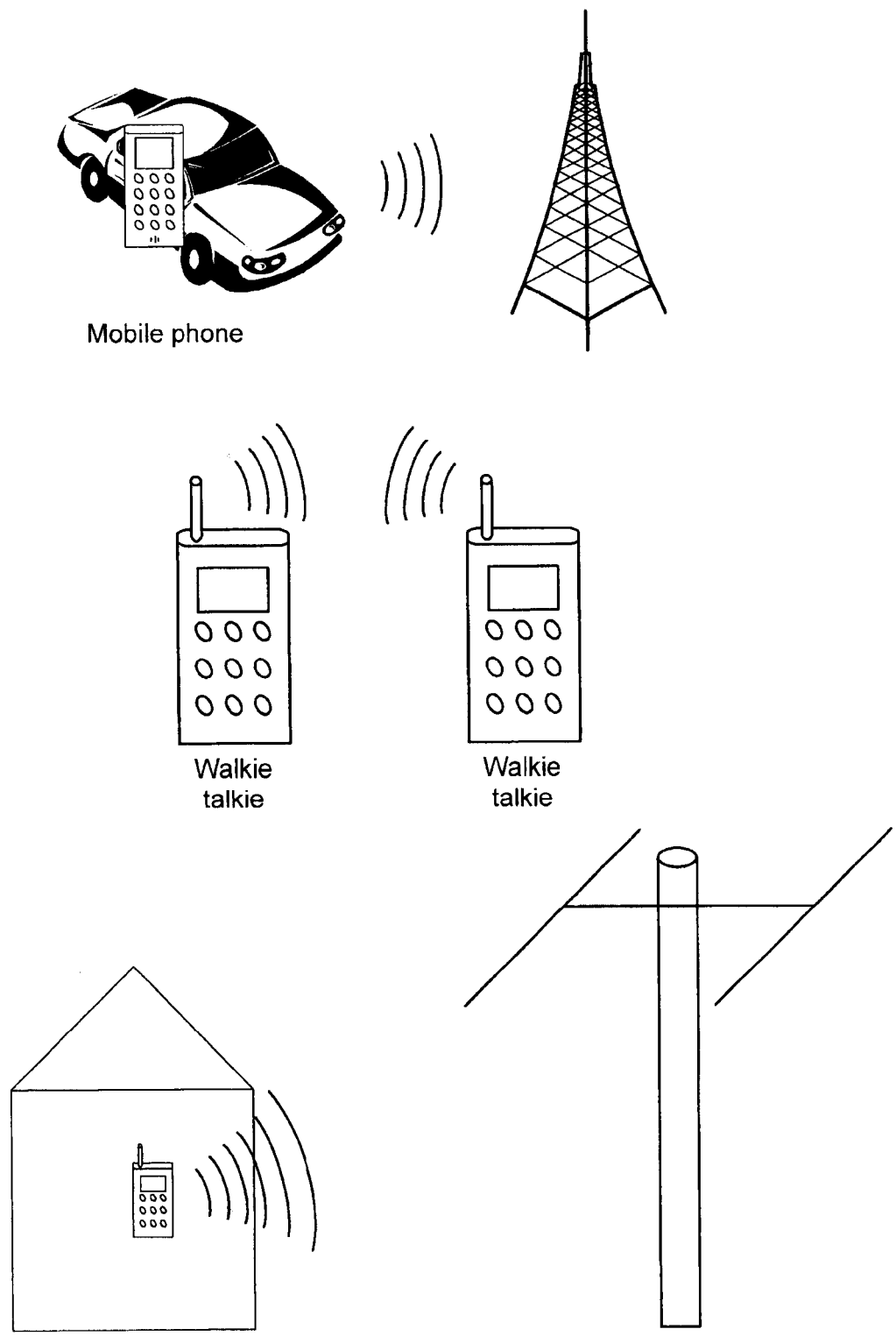
FIG. 4 is a diagram illustrating a three-in-one telephone implementation of the system for wireless connection to a document processor according to one embodiment of the subject application.

Three-in-one telephone: As shown in FIG. 4, a three-in one telephone is disclosed. At home, the telephone functions as a portable telephone (fixed line charge). When on the move, the telephone functions as mobile telephone (cellular charge). And when the telephone comes within the range of another mobile telephone with built-in BLUETOOTH® technology it functions as a walkie-talkie (no telephony charge).

Figure 5:
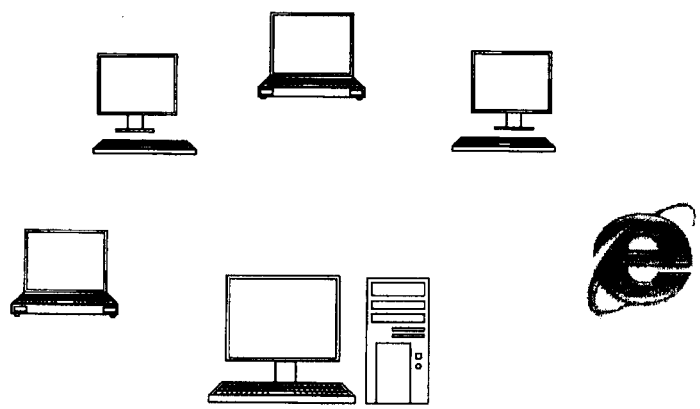
FIG. 5 is a diagram illustrating an Internet bridge implementation of the system for wireless connection to a document processor according to one embodiment of the subject application.

Internet Bridge: As shown in FIG. 5, a user may use mobile computer to surf the Internet wherever they are, and regardless if they're cordlessly connected through a mobile telephone (cellular) or through a wire-bound connection (e.g. PSTN, ISDN, LAN, xDSL).

Figure 6:
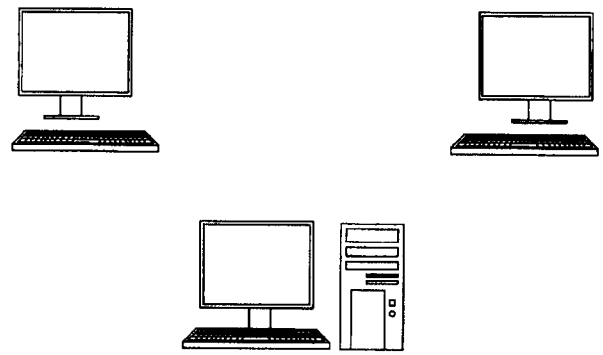
FIG. 6 is a diagram illustrating an interactive conference implementation of the system for wireless connection to a document processor according to one embodiment of the subject application.

Interactive Conference: As shown in FIG. 6, in meetings and conferences the user may transfer selected documents instantly with selected participants, and exchange electronic business cards automatically, without any wired connection.

Figure 7:
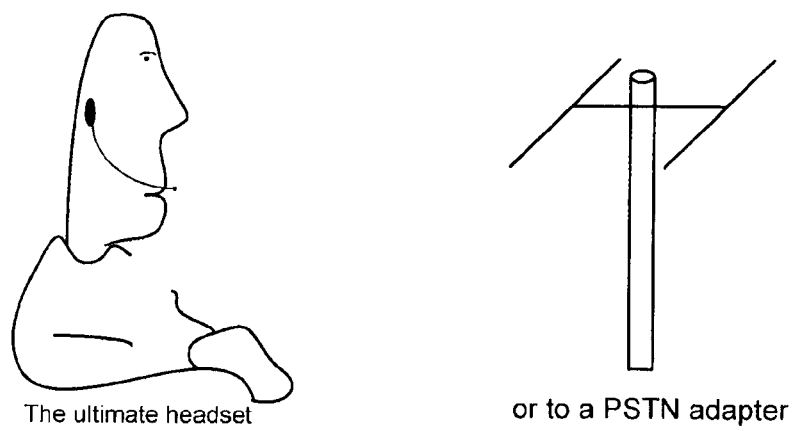
FIG. 7 is a diagram illustrating a wireless headset implementation of the system for wireless connection to a document processor according to one embodiment of the subject application.

Ultimate Headset: As shown in FIG. 7, the user may connect its wireless headset to a mobile telephone, mobile computer, or any wired connection to keep the user's hands free for more important tasks when the user is at the office or in the automobile.

Figure 8:
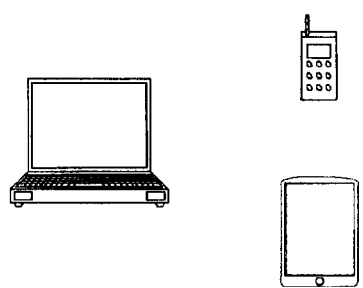
FIG. 8 is a diagram illustrating an automatic synchronization implementation of the system for wireless connection to a document processor according to one embodiment of the subject application.

Ultimate Synchronizer: As shown in FIG. 8, the ultimate synchronizer allows the user to automatically synchronize a desktop, mobile computer, notebook (PC-PDA and PC-HPC) and a mobile telephone. For instance, as soon as the user enters his office the address list and calendar in the notebook computer will automatically be updated to agree with the one in the user's desktop or vice versa.

Figure 9:
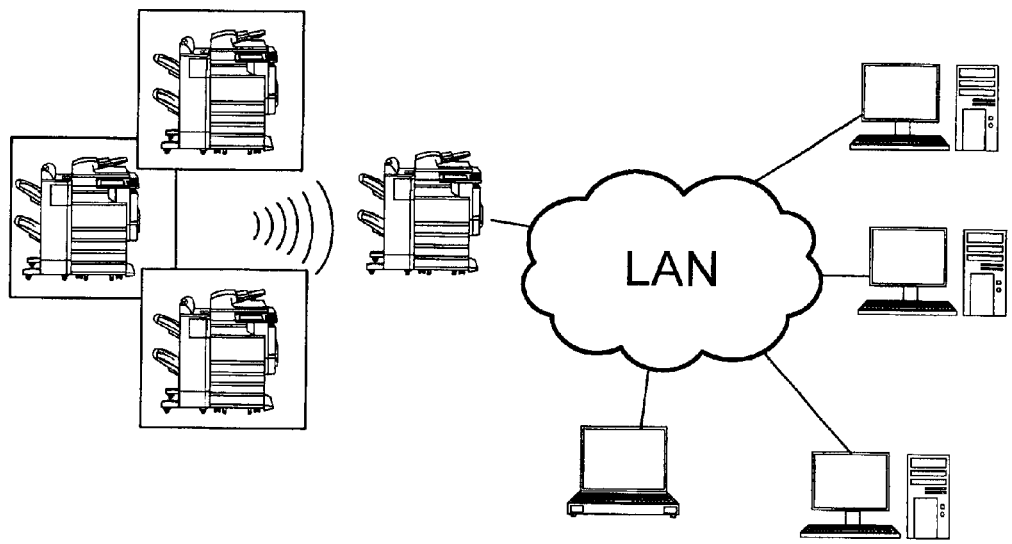
FIG. 9 is a diagram illustrating a wireless cluster print implementation of the system for wireless connection to a document processor according to one embodiment of the subject application.

Wireless cluster printing: As shown in FIG. 9, print jobs are sent to a master printer. The master printer will then distribute the job among available printers using BLUETOOTH® communication. With this implementation, print jobs can be redirected if a device is down due to paper out, or a service problem. Additionally, the device will have dynamic load balancing to achieve the fastest output.

Figure 10:
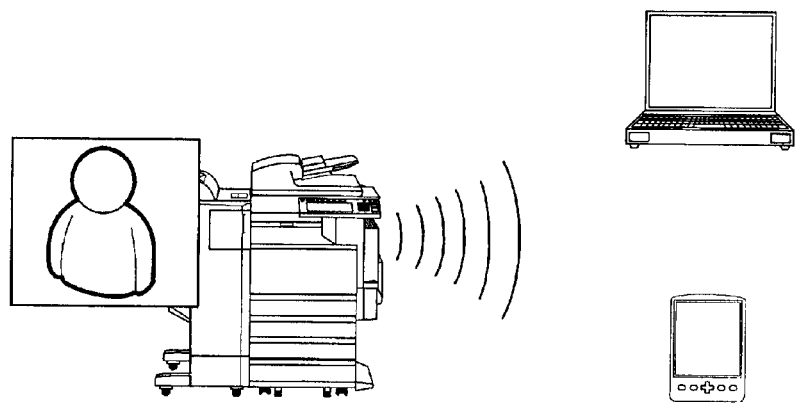
FIG. 10 is a diagram illustrating a wireless document distribution implementation of the system for wireless connection to a document processor according to one embodiment of the subject application.

Wireless document distribution: As shown in FIG. 10, a user walks up to the copier and scans the document. Provides the ability to receive a facsimile and redirect to laptop and PDA. The document is converted to PDF (or other format) and distributed to a laptop or PDA via BLUETOOTH®. One benefit associated with this method is that a user is given the ability to receive incoming facsimiles or documents on a laptop or PDA. A negative result is that transmission of large documents may take a while and client software is required to receive the document.

Figure 11:
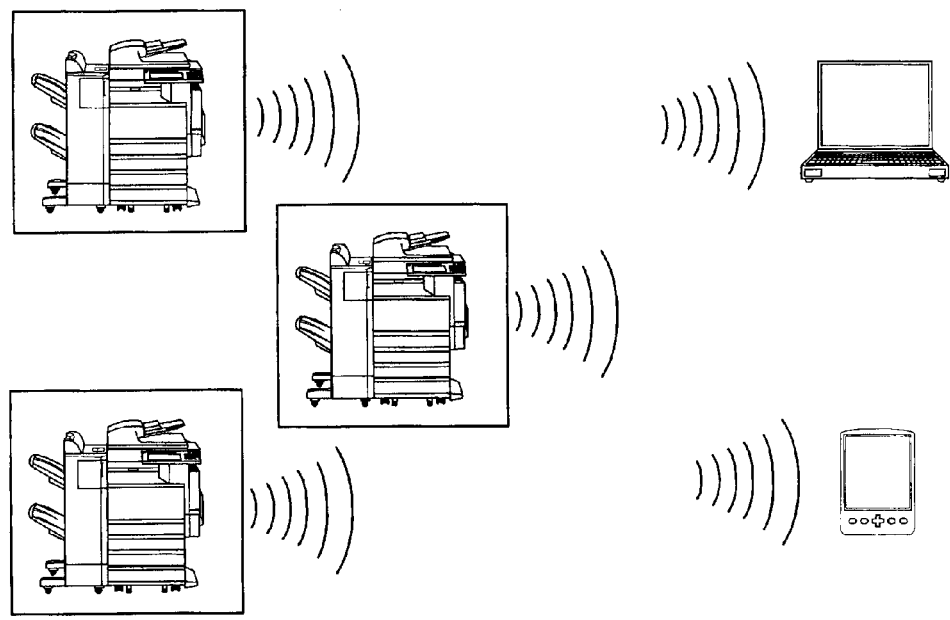
FIG. 11 is a diagram illustrating a wireless management implementation of the system for wireless connection to a document processor according to one embodiment of the subject application.

Wireless management: As shown in FIG. 11, wireless management allows a device to broadcast events such as a warning message, i.e., paper out, toner low, and error condition (fuser error). Both a laptop and a PDA can be used to configure the device administration. In addition, BLUETOOTH® provides WAP interface for device management. Thus, an administrator may be mobile, that is not confined to a desk, for device management.

Figure 12:
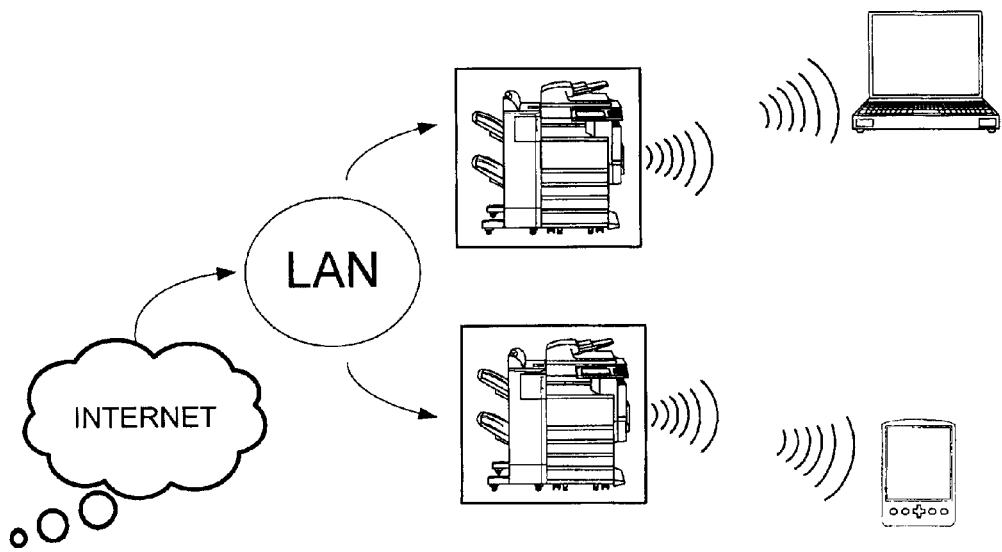
FIG. 12 is a diagram illustrating a wireless gateway implementation of the system for wireless connection to a document processor according to one embodiment of the subject application.

Wireless gateway: As shown in FIG. 12, the wireless gateway allows access to the network from BLUETOOTH® enabled device (laptop, PDA) without the requirement of a LAN connection.

The general operation of a BLUETOOTH® enabled server device will now be discussed.

A BLUETOOTH® enabled server will generally operate in the following manner:

Step No. 1: Wait for signal: If a packet is not received from a client within a predetermined amount of time, the server triggers an expiration error and Step No. 1 is repeated. If a packet is received within the predetermined amount of time, the server sends an "Acknowledgment" ("ACK") signal and progresses to Step No. 2.

Step No. 2: Wait for data: If a data packet is not received by the server within a predetermined amount of time, the server triggers an expiration error and proceeds to Step No. 6. If a data signal is received, the server progresses to Step No. 3.

Step No. 3: Verify Data: If an error is determined, the server sends an Non-Acknowledgment ("NACK") signal and returns to Step No. 2 to wait for retransmission of the data. If the data is verified, the server continues on to Step No. 4. The present invention contemplates many methods for verifying correct data transmission, including CHECKSUM calculation.

Step No. 4: Valid Data or EOF Flag: If an end of file ("EOF") flag is received, the server transmits a confirming EOF string back to the client and progresses to Step No. 6. If valid data is received, the server writes the data to an output file which may reside in memory, a disk storage medium, or any other commonly used storage media. The server then continues on to Step No. 5.

Step No. 5: ACK: Upon receiving valid data and not an EOF flag, the server sends an ACK signal to the client and the server continues on to Step 2 to continue transferring the data file. This method is repeated until the program is properly terminated or upon completion of the data to be transferred.

Step No. 6: Exit: Indicates a user or manufactured defined condition has been completed or signaled and the server terminates the executed algorithm and allows a newly entered command or data signal to be processed.

The operation of a BLUETOOTH® client will now be discussed.

Step No. 1: The client searches into the designated directory for an input file.

Step No. 2: The client sends a first signal, "RURdy" in the DataBuffer format. The DataBuffer format is:

```
enum DATATYPE {RURdy, file, URL};
MAX = 10240;
#pragma pack(1)
struct DataBuffer {DATATYPE dataType;  //type of data being sent
            long length;          //length of data
            long xsum;            // data checksum value
            char data[MAX];       //10KB data block itself
        } *DBptr;
#pragma pack
xsum is calculated as: for (index =0; index <DBptr->length; index++)
        xsum+=long (DBptr ->data[index]);
```

Step No. 3: The client waits for a response from the server, typically either an ACK or NACK. If a NACK is received Step No. 2 is repeated. If an ACK is received, the client progresses on to Step No. 4.

Step No. 4: The client reads the data from the input file.

Step No. 5: The client sets up the DataBuffer and transmits the packet to the server.

Step No. 6: The client then waits for a four character string response, ACK/NACK. If Nack, the client goes to Step 4. If ACK, the client continues on to Step No. 7.

Step No. 7: If the client has reached EOF (Determined from Step No. 4), the client, write datablock contains "FINISH" and is transmitted to the server. The client then proceeds to Step No. 8. If the client has not reached the EOF, the client returns to Step No. 4 and continues the above listed steps until properly terminated.

Step No. 8: The client terminates transmission of data with the server.

BLUETOOTH® Printing

Figure 13:
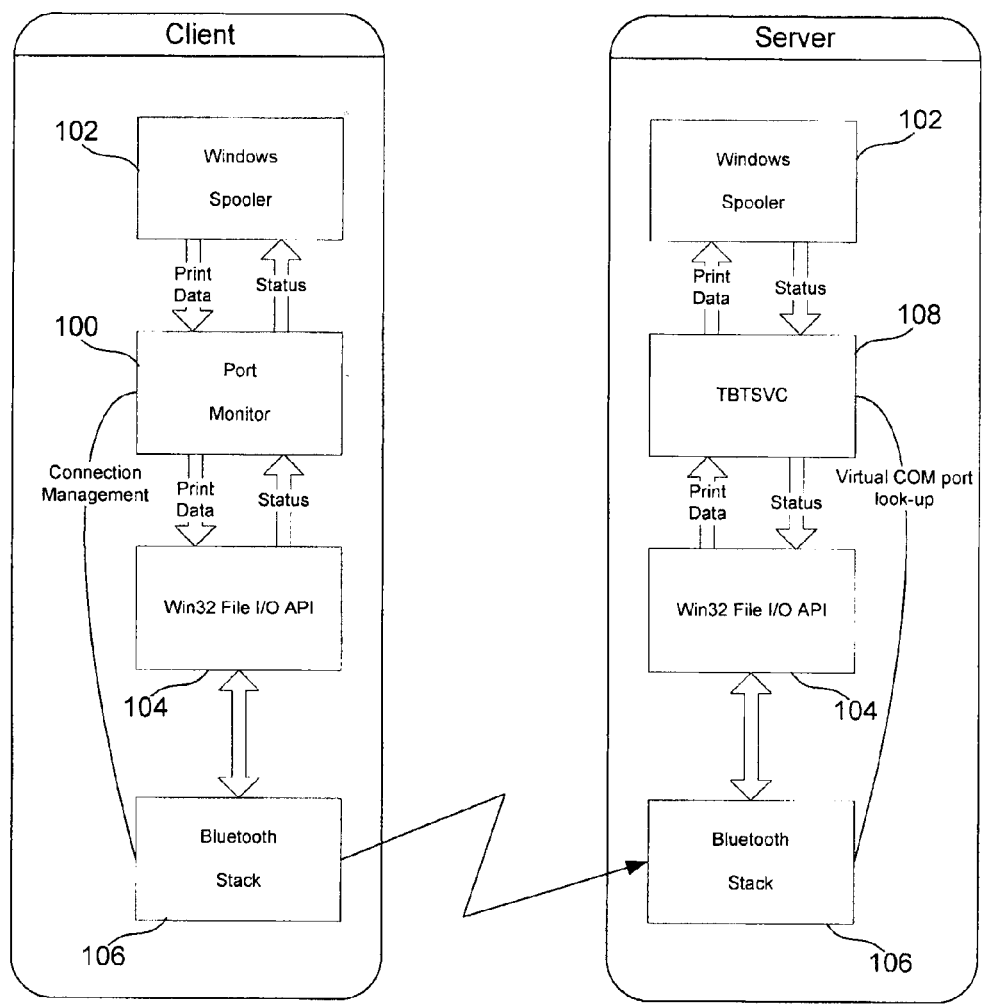
FIG. 13 is a block diagram illustrating an implementation of the system and method for wireless connection to a document processor according to one embodiment of the subject application.

In one particular aspect of the present invention, a BLUETOOTH® Printing system is contemplated to support printing from a PC or other client device to a network controller over a BLUETOOTH® wireless network. A major design goal of the present system is achieve network transparency, i.e. during normal every day usage a user should have no specific awareness of BLUETOOTH® as the communications channel. Rather, to the user, the connection should appear indistinguishable to a direct printer connection to the client device, i.e. a hard-wired serial or USB connection. To facilitate this functionality, the invention includes a port monitor DLL. As shown in FIG. 13, the present port monitor 100 is incorporated into the Windows Spooler System 102 that is responsible for opening a communications channel between the user-mode print spooler and the kernel-mode port driver. In the preferred embodiment, the kernel mode port driver resides on a separate machine. A BLUETOOTH® Service application, shown in FIG. 13 as TBTSVC 108, is a program that runs on the network controller to provide the port monitor 100 with an indirect interface to the port driver.

FIG. 13 illustrates the relationship between the port monitor 100, the TBTSVC 108 the Windows system components 102, 104, and BLUETOOTH® software 106. FIG. 13 also illustrates the flow of data through the BLUETOOTH® system. A print job originates in the Spooler 102. The Spooler 102 directs the port monitor 100 to open a specified port. For example, a directly-connected printer on a machine's parallel port would be opened by the port monitor 100 using a "CreateFile" function with a file name argument of "LPT1." The Spooler 102 invokes the port monitor 100 when a printer has been configured to use a port with a name containing a prefix of "TBP". Once the port is opened, the Spooler 102 sends data to the printer via the port monitor 100. The port monitor 100 transmits the data to the server using a WriteFile function. When the Spooler 102 has processed all the data it informs the port monitor 100 and the port monitor 100 closes the port and disconnects the virtual COM port connection. A print job operation in the present print monitor 100 deviates from the normal operation in two important respects. First, before opening a port, the print monitor 100 uses the BLUETOOTH® software 106 to establish a connection between a local virtual COM port and a remote virtual COM port on the server. Second, before a port is closed, the print monitor 100 breaks the virtual COM port connection to the server.

Figure 14:
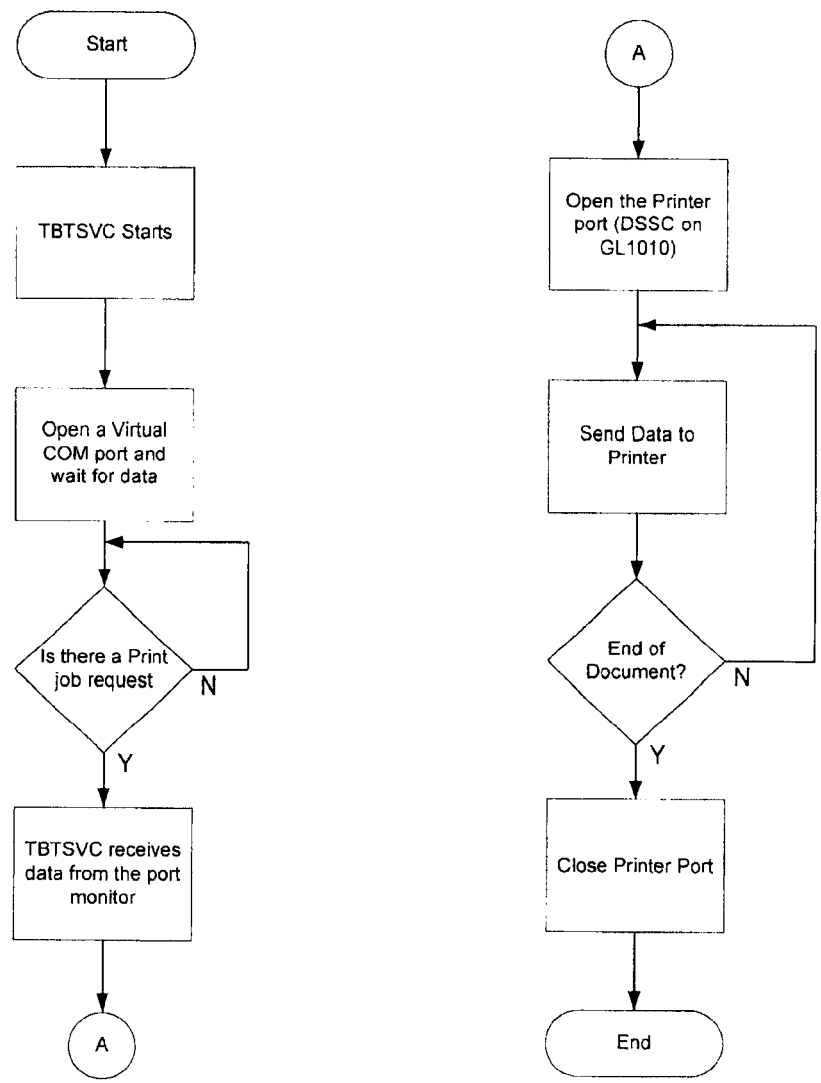
FIG. 14 is a flowchart illustrating an implementation in the system and method for wireless connection to a document processor according to one embodiment of the subject application.

On the server, as shown in FIG. 14, when the system is booted, TBTSVC 108 is automatically executed. It opens a virtual COM port and "listens", i.e. waits, for data to arrive. When it detects a new print job it opens the local default printer and writes print data to it. When TBTSVC receives an end-of-data packet it closes the local printer and returns to its initial state, i.e. listening for data. The present BLUETOOTH® Printing system is a "client/server" architecture. The port monitor 100 (called "TBTMON") is the client element of the architecture. The BLUETOOTH® Service application (called "TBTSVC" 108, an NT service application) is the server element of the architecture. TBTSVC 108 is a passive receiver. It is essentially idle while it is waiting for a connection from a client port monitor 100. Once the connection is established TBTSVC 108 creates a local print job. It then continues treading data from the connection and writing it to the printer until and end-of-data notification is received. Upon receiving the end-of-data notification TBTSVC 108 closes the print job.

Several requirements influence the direction the design of TBTSVC 108. TBTSVC 108 is preferably intended to support the Toshiba BLUETOOTH® Card, manufactured by the present assignee. This card is reputed to be the industry leader (at least in terms of market share) and is OEM'ed by Toshiba from Digianswer. A BLUETOOTH® stack is included with the installation of the card's drivers. Digianswer supports a Software Development Kit (SDK) that provides an interface to the BLUETOOTH® stack. This provides third parties with a convenient mechanism to utilize BLUETOOTH® communications. Therefore TBTSVC 108 will utilize the BLUETOOTH® COM interface developed by Digianswer.

TBTSVC 108 needs to be automatically executed when the print server machine is booted. Since the server (preferably a GL1010 server) is preferably running a version Windows NT as its operating system, the objective is achieved by making TBTSVC 108 a service type application. Service applications are notoriously difficult to debug so a special "debug" mode will be implemented. When run in this mode, TBTSVC will omit calling the code that attaches the program to the Service Control Manager (SCM). This will allow the application to exercise most of its startup code, general-purpose routines, and profile handler code while being run in the debugger. It will also allow the service to be run on Windows 9x platforms.

TBTSVC 108 will be implemented in an object-oriented manner, having numerous benefits. One significant benefit in this case is that functionality for HCRP, BPP, and Serial interface support will be completed isolated from one another. The ultimate goal of TBTSVC 108 is to support the simultaneous operation of the BLUETOOTH® Hardcopy Cable Replacement Profile (HCRP) and the Basic Print Profile (BPP). In order to isolate the functionality of the profile handling code from another profile handler each profile handler will preferably be implemented as a separate object type. These object types will derive from a more basic profile handling class that supports methods common to the normal execution of the profile handlers, e.g. "Run" or "Shutdown".

In accordance with the present invention, a file can be printed to a BLUETOOTH® printer by 1) printing from any application; and 2) selecting a printer driver that has been configured to print to a desired BLUETOOTH® port. If the destination printer assigned to the port is connectable then the file is transmitted to the printer and printed without further ado or user intervention. In this respect, printing to a BLUETOOTH® connected printer is no different than printing to a normal wired printer.

Figure 21:
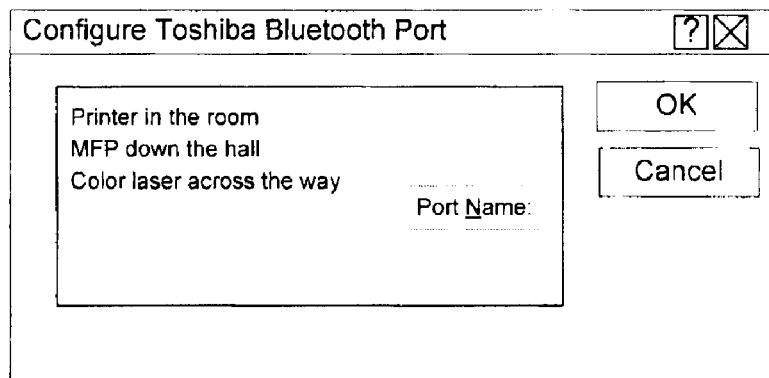
FIG. 21 is a screen template illustrating a printer port configuration page for use in the system and method for wireless connection to a document processor according to one embodiment of the subject application.
Figure 22:
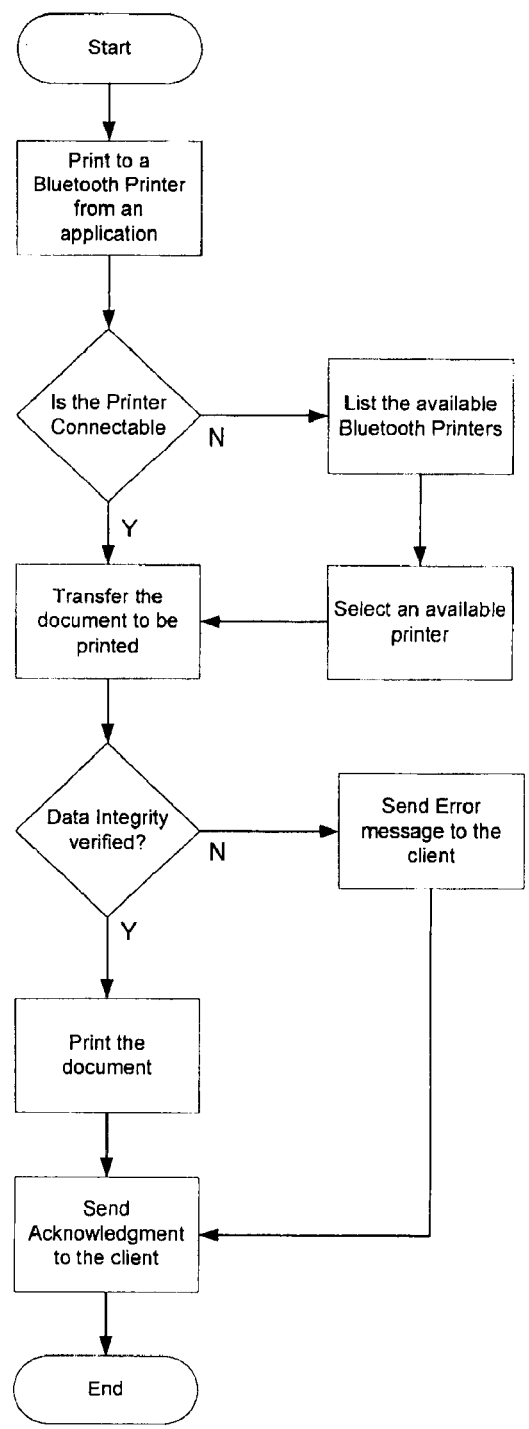
FIG. 22 is a flowchart illustrating a wireless printing implementation of the system and method for wireless connection to a document processor according to one embodiment of the subject application.

A flowchart for printing to a BLUETOOTH® printer is shown in FIG. 22. At a first decision block, a determination is made as to whether the device is connectable. If it is not, then a "Configure Port" dialog box is displayed as shown in FIG. 21, asking the user to select destination device. In this instance, only devices that are currently connectable are displayed. (In 'Configure Port' all devices from the Service Discovery Database (SDDB) are displayed, which could include devices that were connectable at another time but are not when the dialog box is displayed.) When data is being sent to the printer, each data packet contains a checksum to insure data integrity. After the print job is completed the receiver sends an acknowledgment message indicating whether the job was received successfully. If it was not, a message displays on the sender indicating there was a problem printing the job.

A BLUETOOTH® device is capable of supporting multiple connections and transfers simultaneously, and applies to both sender and receiver. There can be multiple connections between a single pair of devices, or a device can be connected to several different devices simultaneously. On the sending side each simultaneous connection requires a virtual serial port and a BLUETOOTH® port. For example, supporting three simultaneous connections requires three virtual serial ports and three BLUETOOTH® ports. On the receiving side, the number of simultaneous connections is determined by the number of virtual serial ports that are created. It should be noted that the while the interface itself supports multiple connections, a particular printer controller may or may not want to take advantage of this feature. For a controller that is capable of receiving and spooling multiple print jobs simultaneously this might be a good feature. A controller that does not have spooling capability might want to restrict the number of simultaneous connections to just one, and allow spooling to take place on the client.

The implementation in accordance with the present invention includes the following components: on the client side, port monitor 100 and an installation program; on the server side, NT service. The implementation is preferably based on the BLUETOOTH® Serial Port Profile (SPP). This is one of the profiles that are currently supported the existing BLUETOOTH® documentation and development tools. SPP allows a program to read and write over a BLUETOOTH® virtual serial port as if it were a regular serial port. From the user's perspective there are two aspects to BLUETOOTH® printing: (1) configuring the port to print to a BLUETOOTH® device, and (2) printing to a BLUETOOTH® device. Configuring the port is accomplished through the Control Panel/Printers/Properties menu on Windows. These property sheets allow a port to be added, modified, or deleted.

Figure 15:
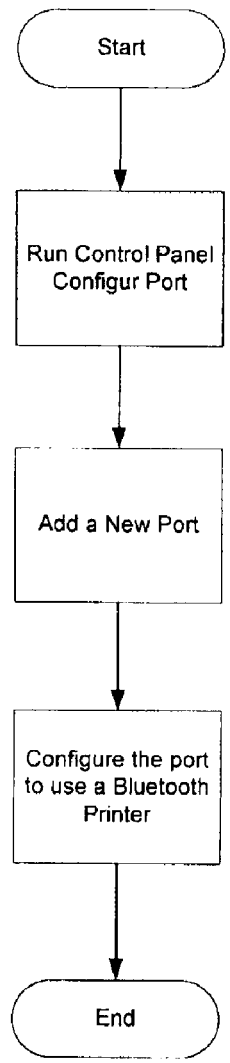
FIG. 15 is a flowchart illustrating port configuration in the system and method for wireless connection to a document processor according to one embodiment of the subject application.
Figure 16:
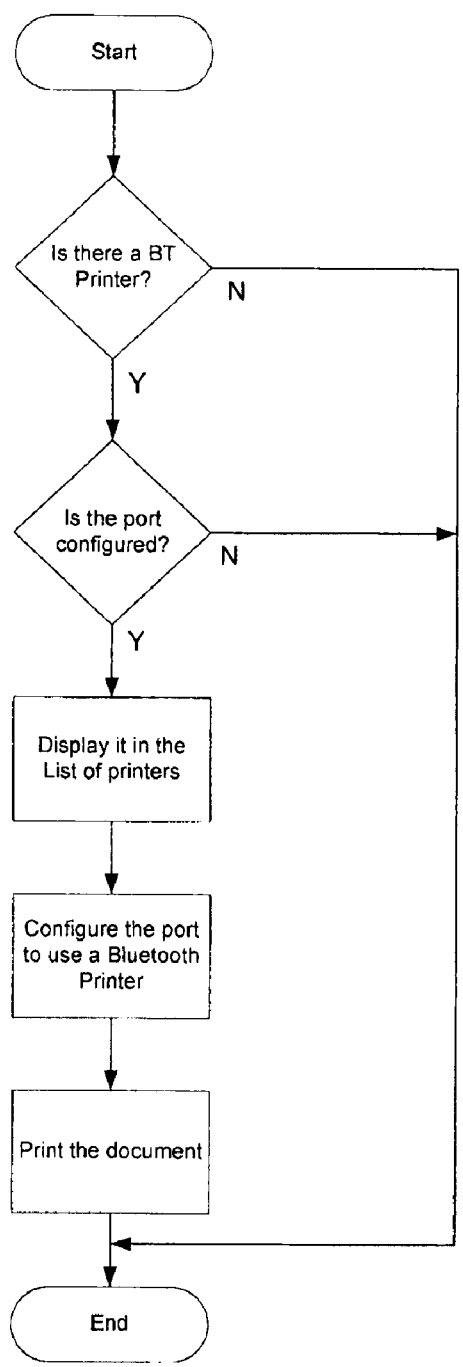
FIG. 16 is a flowchart illustrating an implementation of the system and method for wireless connection to a document processor according to one embodiment of the subject application.

FIG. 15 shows the flowchart for the port configuration. After a port is properly configured, printing is accomplished the same way as the user prints to any device: that is, by printing from any application program and selecting a printer (actually a printer driver) that is configured for a BLUETOOTH® port. If the port is properly configured then no other actions are required of the user during printing. If the BLUETOOTH® device is not available then a dialog box displays allowing the user to select a BLUETOOTH® device, or cancel the print job. shows the steps of printing to a BLUETOOTH® printer in accordance with the present invention. The invention is preferably supported in any of the Windows family of operating system platforms, but the invention could be modified and adapted for any other type of platform, without departing from the invention.

The SPP enables a BLUETOOTH® virtual serial port to be created that can be accessed through the regular serial port I/O functions (read( ), write( ), open( ), etc.). A virtual serial port is created through the BLUETOOTH® configuration tool. (This is a program provided by BLUETOOTH®.) Once a port is created it is available for reading and writing by any program using the standard serial I/O functions. The SPP is implemented by products from Digianswer (a company that makes an SDK for BLUETOOTH®) as an object that works in conjunction with several other profiles and interfaces also provided by Digianswer. Together the profiles and interfaces provide a number of services and facilities required for BLUETOOTH® devices, beyond serial port emulation. The services include features such as: doing an 'Inquiry' to see what devices are available; establishing a BLUETOOTH® link between two devices; and a notification interface allowing the application to be notified when asynchronous BLUETOOTH® events occur.

Figure 17:
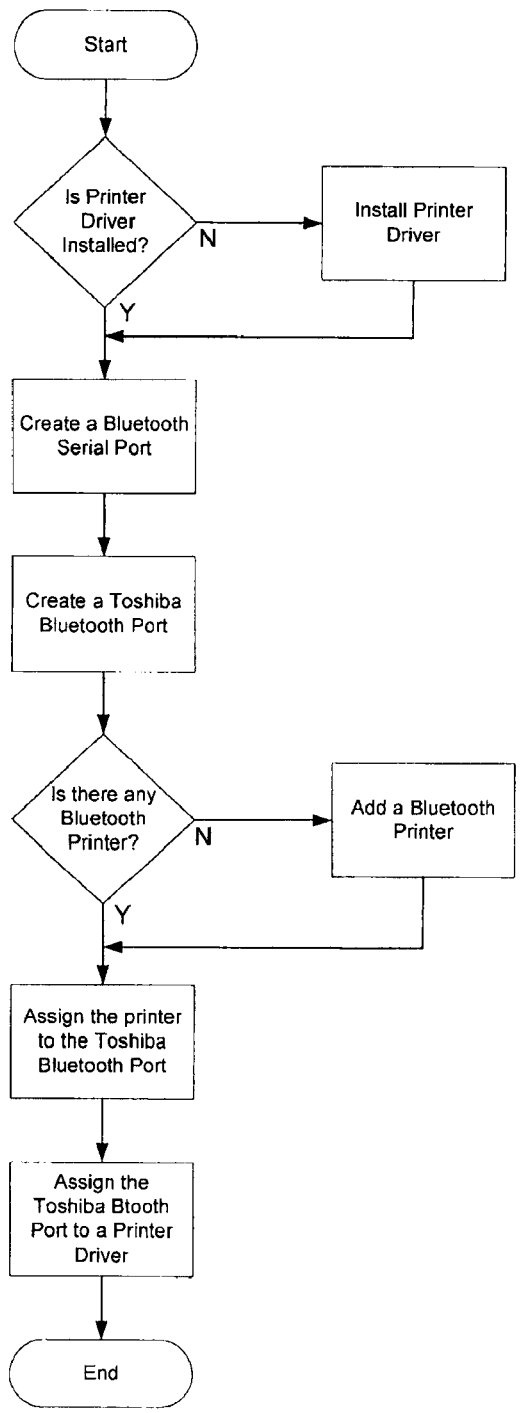
FIG. 17 is a flowchart illustrating client side configuration in the system and method for wireless connection to a document processor according to one embodiment of the subject application.
Figure 18:
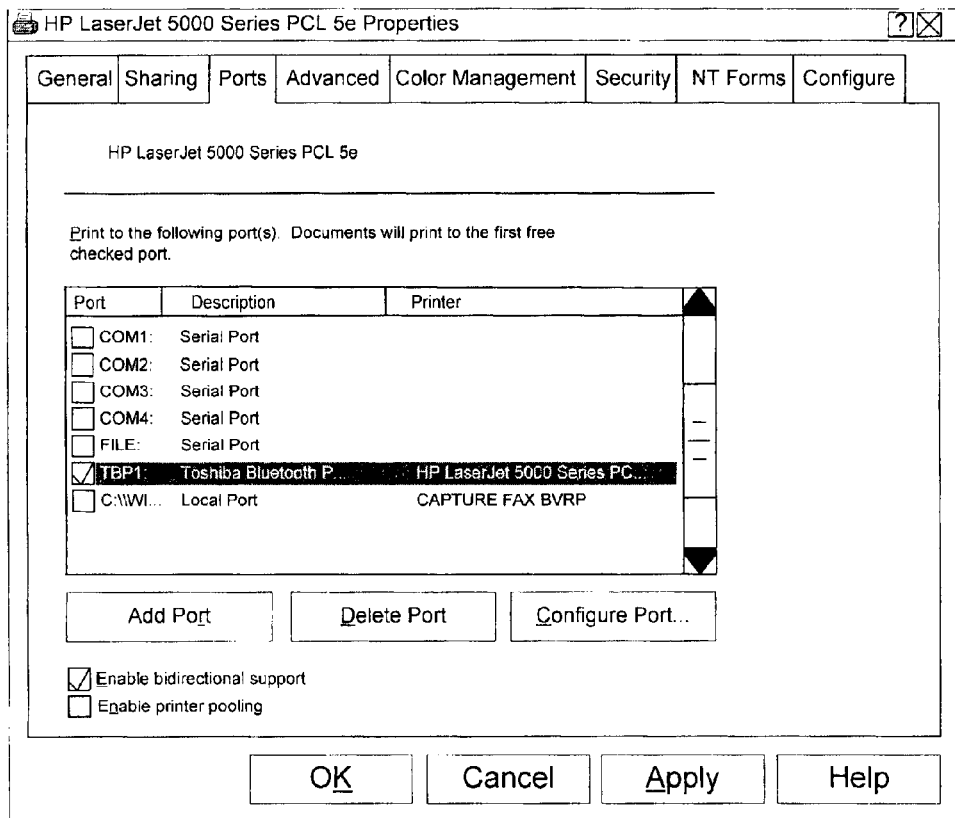
FIG. 18 is a screen template illustrating a printer configuration page for use in the system and method for wireless connection to a document processor according to one embodiment of the subject application.

The steps to configure for BLUETOOTH® printing on the client side are as follows. FIG. 17 is a flowchart showing the steps of the operation. A BLUETOOTH® serial port is created using the BLUETOOTH® configuration tool. A BLUETOOTH® port is created from Printers/Properties/Ports. A connectable BLUETOOTH® device is assigned to the BLUETOOTH® port. A BLUETOOTH® port is assigned to a printer driver. This configuration operation assumes that the printer driver is already installed. If not, that needs to be done using the standard Windows 'Add Printer' wizard. The BLUETOOTH® configuration tool in step #1 is a program provided by BLUETOOTH®. A BLUETOOTH® serial port is a system resource that is used internally by the port monitor and the BLUETOOTH® profiles. After the serial port is created no additional configuration for it needs to be done. Steps 2-4 are accomplished through the 'Ports' property dialog box in Control Panel/Printers/Properties. That dialog is shown in FIG. 18, which is a standard printer configuration page displayed by the Windows spooler. There are three configuration functions: "Add Port", "Delete Port", and "Configure Port".

Figure 19:
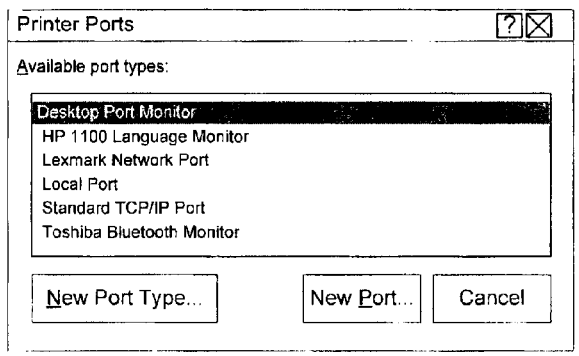
FIG. 19 is a screen template illustrating a printer configuration port addition page for use in the system and method for wireless connection to a document processor according to one embodiment of the subject application.
Figure 20:
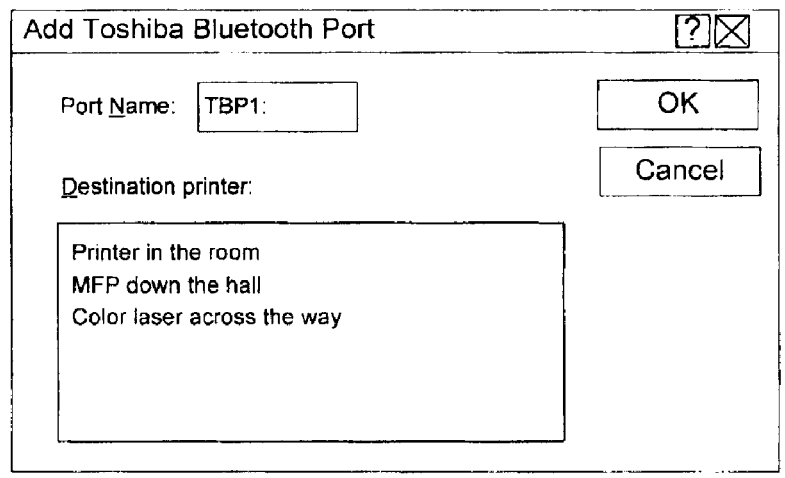
FIG. 20 is a screen template illustrating depicting wireless devices for use in the system and method for wireless connection to a document processor according to one embodiment of the subject application.

When "Add Port" is clicked, the screen shown in FIG. 19 is displayed. This screen is also displayed by the Windows spooler. The options correspond to the print monitors that have been installed. To create a BLUETOOTH® port, select "Toshiba BLUETOOTH® Monitor" then press "Add Port . . . ". The screen shown in FIG. 20 is displayed. This screen is displayed by the software of the present invention. Default port name is "TBPx", where "x" is the next available number for which a Toshiba BLUETOOTH® port doesn't already exist. The screen of FIG. 20 shows all BLUETOOTH® devices that support the BLUETOOTH® SPP, and could include devices not made by the present assignee. The destination printer names displayed are the 'friendly names' of all known SPP servers. The list includes all devices from the Service Discovery Data Base (SDDB), which includes all devices that have been connectable either now or in the past.

Even though the "Add Port" procedure is invoked from the properties page for a particular printer, once a port has been created it is a system resource that is available to all printers. When "Configure Port" is pressed the screen shown in FIG. 21 is displayed. This is the same as the screen displayed in "Add Port", without the port name field. When "Delete Port" is pressed a message box is displayed asking to confirm that the port should be deleted. The only configuration required on the server is to create the virtual serial port, using the BLUETOOTH® configuration tool from BLUETOOTH®. After the ports are configured, the user can print using the BLUETOOTH® SPP-based printing system, as described above.

Figure 23:
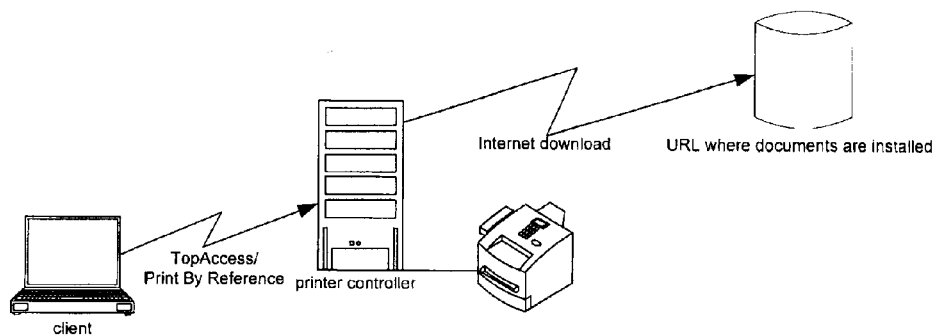
FIG. 23 is a diagram illustrating a URL-printing implementation of the system and method for wireless connection to a document processor according to one embodiment of the subject application.
Figure 24:
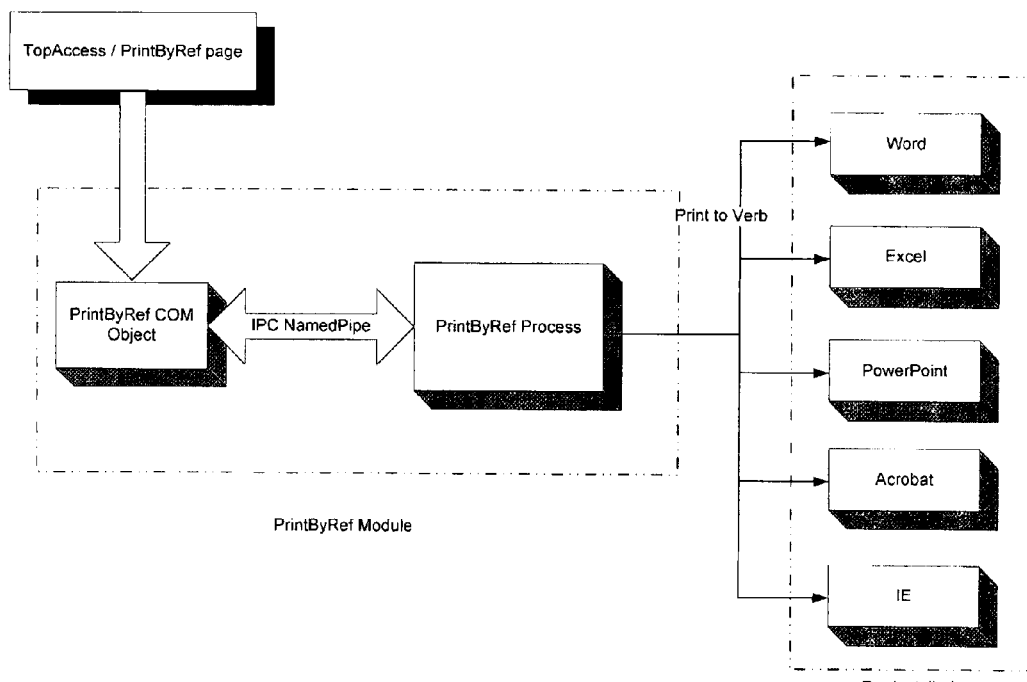
FIG. 24 is a flowchart diagram illustrating the URL-printing implementation of the system and method for wireless connection to a document processor according to one embodiment of the subject application.
Figure 25:
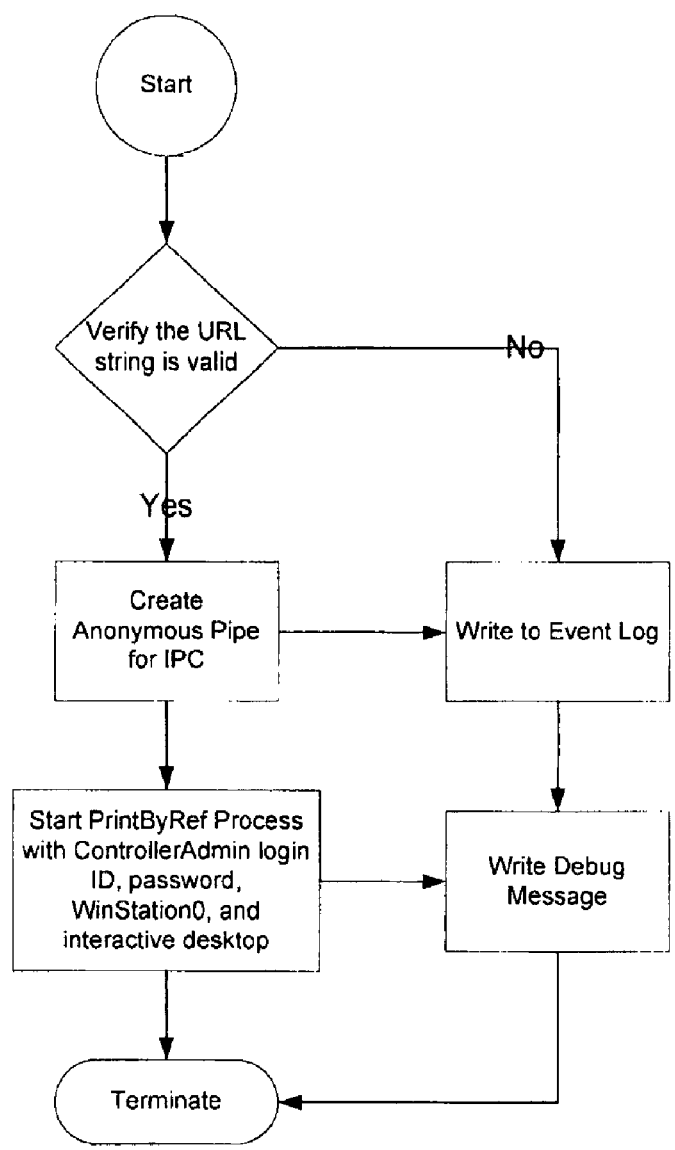
FIG. 25 is a flowchart illustrating the URL-printing implementation of the system and method for wireless connection to a document processor according to one embodiment of the subject application.
Figure 26:
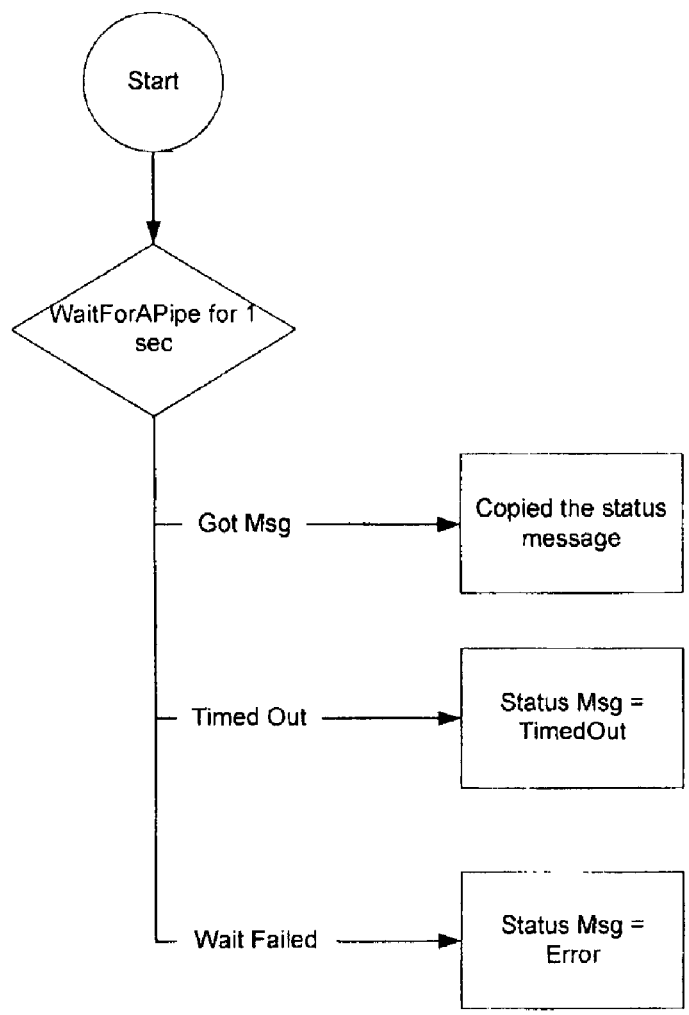
FIG. 26 is a flowchart illustrating an implementation of the system and method for wireless connection to a document processor according to one embodiment of the subject application.
Figure 27:
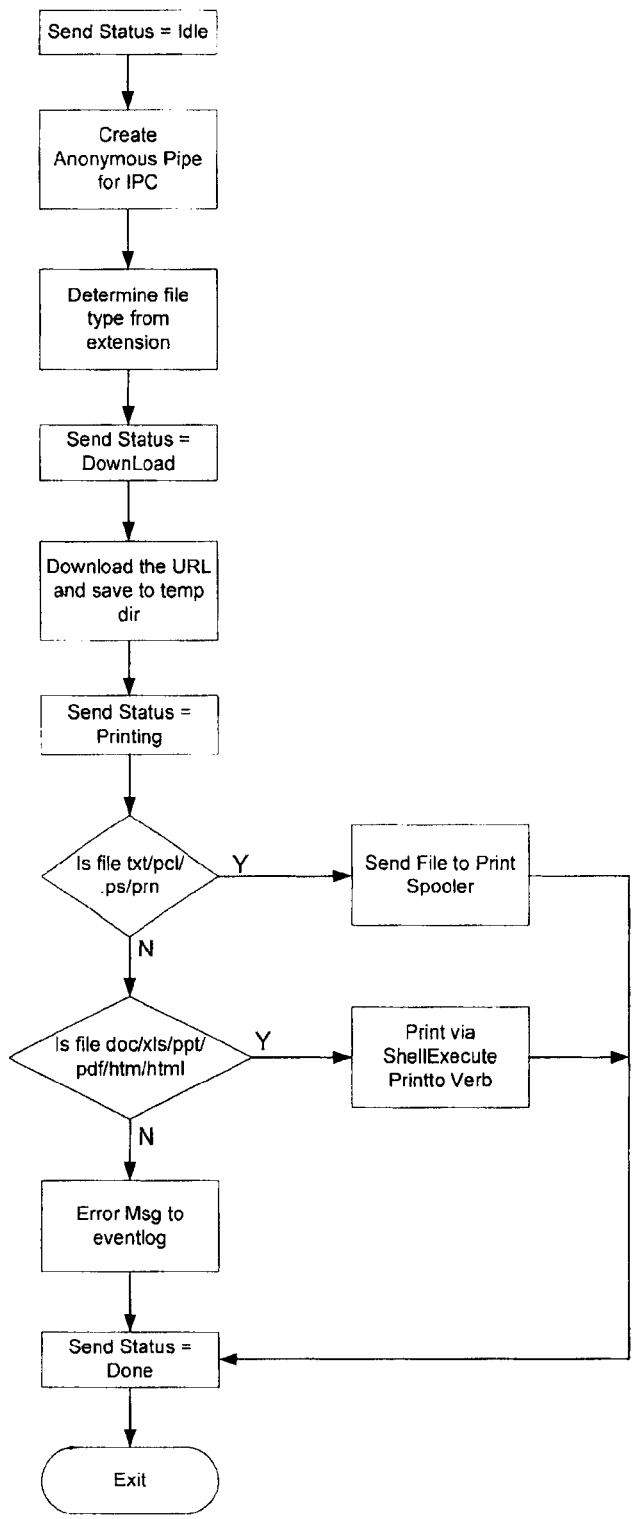
FIG. 27 is a flowchart illustrating an implementation of the system and method for wireless connection to a document processor according to one embodiment of the subject application.

Sometimes it is desired to send a URL of a file to the printer to print instead of the actual print data. The printer, upon receiving the URL, will go to the Internet to download the file and print. The file can either be in a printable format, postscript, or any other raw application. For raw application data to be printable, the application itself must be installed in the printer controller. The hardware realization is shown in FIG. 23 and a flow chart of the steps is shown in FIG. 24. Currently, the following applications are supported: Word, Excel, PowerPoint, Acrobat, and HTML. This feature called PrintByReference is extremely useful for printing a pre-stored document on the Internet via a PDA. To print-by-reference, the client connects to the server TopAccess/PrintByReference page and sends a text string of the file URL. The PrintByReference module resides inside the server and consists of two components, the PrintByReference process and PrintByReference COM interface.

PrintByReference process is an executable component that would do the actual file download and print. The file download task use windows WININET API and currently support http servers only. The file print task use windows ShellExecute API to launch the applications printto verb. It is required that the supporting application (i.e. Words, Excel, PowerPoint, and Acrobat) has to be installed in the server. PrintByReference COM interface is a COM object that act as the interface between the TopAccess page and PrintByReference process. This interface allows the client to send the URL to the printer and also retrieve the current print status.

From the foregoing, it should be appreciated that the drawings illustrated herein are shown for the purpose of illustrating a preferred embodiment of the invention only and not for purposes of limiting same. Further, it should be appreciated that the present invention could easily be adapted for other wireless schemes such as in accordance with the IEEE 802.11 standard, and any other type of wireless communication, including radio frequency, microwave, infrared and any other such approach. Moreover, it should be understood that the present invention is suitable for use in connection with such devices, including but not limited to, mobile phones (cellular and digital), smart phones, pagers, messaging devices, personal digital assistants (PDAs), pocket PCs, personal computers (laptops and desktops), TV set top devices, other Internet enabled devices, etc. This list is not exhaustive, and is intended merely to illustrate a preferred embodiment of the present invention, and these and other variations could all be contemplated without departing from the invention.

As described hereinabove, the present invention solves many problems associated with previous type apparatuses. However, it will be appreciated that various changes in the details, materials and arrangements of parts which have been herein described and illustrated in order to explain the nature of the invention may be made by those skilled in the are within the principle and scope of the invention will be expressed in the appended claims.

Having thus described the invention, it is now claimed:

1. A system for wireless connection to a document processor comprising:

a document processor for performing document processing services including at least one of printing and facsimile transmission;

means for configuring a virtual serial port on each of a plurality of associated data processing devices so as to be associated with a Bluetooth transceiver corresponding thereto;

monitoring means for detecting a presence of each of a plurality of concurrent Bluetooth data communications directed to the document processor, each Bluetooth data communication being initiated by a corresponding associated data processing device of a plurality thereof;

receiver means for receiving a request data packet directed to a virtual serial port on each associated data processing device, each request packet including data representative of a corresponding request of document processing services directed to the document processor, upon a detection thereof by the monitoring means;

the receiver means including means for receiving a document processing request corresponding to one of the document processing services;

transmitter means for broadcasting via Bluetooth a response packet responsive to each associated data processing device upon successful receipt of a request data packet therefrom;

the receiver means including means for receiving via Bluetooth, from each associated data processing device, at least one corresponding data packet comprising an electronic document corresponding to requested document processing services;

storage means for storing each received data packet corresponding to each electronic document in a data buffer corresponding thereto;

means for terminating storage of received data packets in the data buffer corresponding to each associated electronic document upon receipt of a data packet inclusive of end-of-file request associated therewith;

means for terminating each Bluetooth data communication upon receipt of the data packet inclusive of the end-of-file request;

means for verifying integrity of each received electronic document;

means for printing each received electronic document after termination of an associated Bluetooth data communication and integrity verification; and document output means for commencing of processing of data for each electronic document in the data buffer via the document processor in accordance with requested document processing services upon receipt of a corresponding end of file request associated therewith such that each electronic document processed in an order relative to received end of file requests.

2. The system for wireless connection to a document processor of claim 1 further comprising means adapted for assigning a port to the document processor in accordance with a received request data packet wherein the port is available for receiving Bluetooth data communications from a plurality of associated data processing devices.

3. The system for wireless connection to a document processor of claim 1 wherein the data processing device includes cellular telephones, portable messaging devices, personal digital assistants, and computing devices.

4. The system for wireless connection to a document processor of claim 1 wherein the document processor is a printing device.

5. The system for wireless connection to a document processor of claim 1 wherein the request data packet includes data representative of a uniform resource locator associated with an electronic document, and wherein the receiver means includes means for accessing the uniform resource locator and downloading the associated electronic document therefrom.

6. The system for wireless connection to a document processor of claim 1 further comprising means for receiving configuration parameters for the document processor for processing the requested document processing services.

7. The system for wireless connection to a document processor of claim 1 wherein the monitoring means includes means for periodically detecting a presence of a Bluetooth data communication.

8. A method for wireless connection to a document processor comprising the steps of:
configuring a virtual serial port on each of a plurality of associated data processing devices so as to be associated with a Bluetooth transceiver corresponding thereto;
detecting a presence of each of a plurality of concurrent Bluetooth data communications directed to an associated document processor for performing document processing services including at least one of printing and facsimile transmission, and each Bluetooth data communication being initiated by corresponding associated data processing device of a plurality thereof;
receiving a request data packet directed to a virtual serial port on each the associated data processing device, each request packet including data representative of a corresponding request of document processing services directed to the document processor, upon a detection thereof;
receiving a document processing request corresponding to at least one of the document processing services;
broadcasting via Bluetooth a response packet responsive to each associated data processing device upon successful receipt of a request data packet therefrom;
receiving via Bluetooth, from each associated data processing device, at least one corresponding data packet comprising an electronic document corresponding to requested document processing services;
storing each received data packet corresponding to each electronic document in an associated data buffer corresponding thereto;
terminating storage of received data packets in the data buffer corresponding to each associated electronic document upon receipt of a data packet inclusive of end-of-file request associated therewith;
terminating each Bluetooth data communication upon receipt of the data packet inclusive of the end-of-file request;
verifying integrity of each received electronic document;
printing each received electronic document after termination of an associated Bluetooth data communication and integrity verification; and
commencing of processing of data for each electronic document in the data buffer via the document processor in accordance with requested document processing services upon receipt of a corresponding end of file request associated therewith such that each electronic document processed in an order relative to received end of file requests.

9. The method for wireless connection to a document processor of claim 8 further comprising the step of assigning a port to the document processor in accordance with a received request data packet wherein the port is available for receiving Bluetooth data communications from a plurality of associated data processing devices.

10. The method for wireless connection to a document processor of claim 8 wherein the data processing device includes cellular telephones, portable messaging devices, personal digital assistants, and computing devices.

11. The method for wireless connection to a document processor of claim 8 wherein the document processor is a printing device.

12. The method for wireless connection to a document processor of claim 8 wherein the request data packet includes data representative of a uniform resource locator associated with an electronic document, and further comprising the step accessing the uniform resource locator and downloading the associated electronic document therefrom.

13. The method for wireless connection to a document processor of claim 8 further the step of receiving configuration parameters for the document processor for processing the requested document processing services.

14. The method for wireless connection to a document processor of claim 8 wherein the step of detecting a presence of Bluetooth data communication includes the step of periodically detecting a presence of a Bluetooth data communication.

* * * * *